May 27, 1952  G. A. SEIDEL  2,598,075
APPARATUS FOR PLACING BEAMS IN BALING PRESSES
Filed Jan. 28, 1950
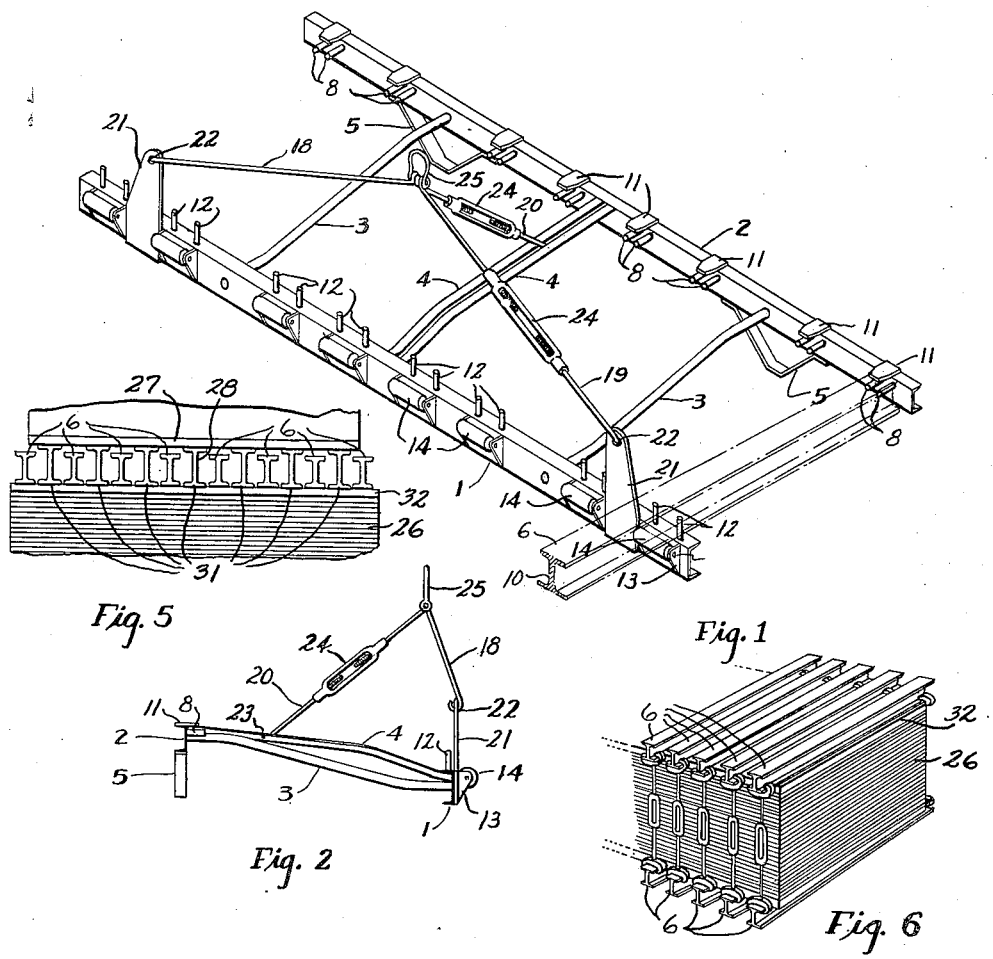
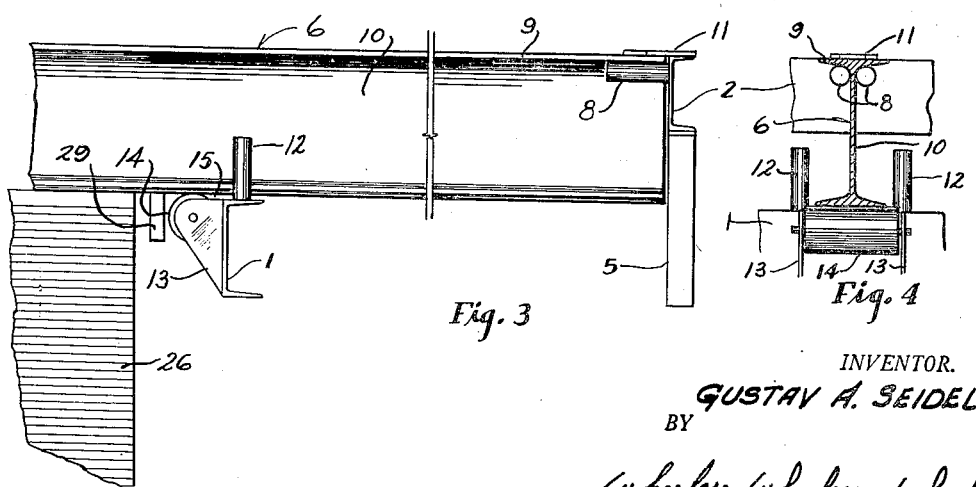
INVENTOR.
GUSTAV A. SEIDEL
BY
Wheeler, Wheeler & Wheeler
ATTORNEYS Patented May 27, 1952

2,598,075

UNITED STATES PATENT OFFICE 2,598,075

APPARATUS FOR PLACING BEAMS IN BALING PRESSES

Gustav A. Seidel, Mellen, Wis., assignor to Splicedwood Corporation, Mellen, Wis., a corporation of Wisconsin Application January 28, 1950, Serial No. 141,069

12 Claims. (Cl. 294—67)

This invention relates to improved apparatus for placing beams in a baling press.

In the following specification and disclosure the invention will be exemplified with reference to the placing of I-beams on top of a bale of plywood panels in a press, but it will be understood that my invention is useful in and adaptable to many press and clamping operations.

The process of compressing plywood panels after the adhesive has been spread upon the several laminations is a batch operation. The assembled panels of plywood are made into a bale consisting of several layers of plywood interspaced by bale reenforcing panels, known as caul boards. The bale is faced, top and bottom, with thick panels called head boards. This stack of plywood, caul boards, and head boards, is compressed in a vertical action hydraulic press, but the drying and curing operation cannot be carried out in the press itself and the contents of the press must be removed and stored in a tightly clamped bale until the adhesive has cured. Since the baling or clamping pressure is exceedingly great, it is necessary that a fairly large number of structural beams, usually steel I-beams, be placed transversely to the length of the bale, both on the top and on the bottom of it. The number of beams used depends, of course, upon the length of the plywood pack being compressed. For instance, in a particular plywood factory where I use my invention, the I-beams are placed one foot apart and a four foot by eight foot panel area would require eight beams above and a like number below.

The I-beams for the top of the bale are placed on the bale after the stacked bale contents are positioned in the hydraulic press and fit into recesses of the upper press platen. The beams are, of course, long enough to extend beyond the limits of the bale on each side and the beams on the top and bottom of the bale are connected and clamped in pairs, with the beam on the top of the bale connected and clamped to its mate on the bottom by steel forged yoke clamps. These clamps are interconnected by a turnbuckle arrangement. While the bale is compressed, the turnbuckles on each set of beams are tightened to hold the bale in a compressed state after it is removed from the press for storage or curing.

When plywood sheets of considerable width are to be baled it is evident that the I-beams must be of considerable size and weight so that manual lifting and positioning of such I-beams, particularly at the top of the bale, is an arduous task, entailing the lifting of individual beams from floor level to shoulder level, or even higher. Furthermore, the beams must be passed over the top of the bale into alignment with and insertion into the recesses of the platen.

It is the principal object of this invention to provide means for loading, lifting, aligning and inserting beam elements to be used for the purpose above described.

More particularly stated, it is an object of this invention to provide a combination lifting device and template to space and locate, lift and insert heavy utility beams.

Another object of this invention is to provide a lifting device for the purpose described wherein the support for beams is so disposed that the properly spaced and arranged beam elements have considerable of their length projected in overhanging cantilevered relationship to the margin of the lifting device and the overhanging portion is freely receivable in any receptor for the overhanging ends.

Other objects will be more apparent upon an examination of the following disclosure.

In the drawings:

Fig. 1 is a perspective view of the I-beam loader shown carrying one I-beam for illustration purposes.

Fig. 2 is a view in end elevation of the I-beam loader.

Fig. 3 is a fragmentary side elevational view showing an I-beam about to be delivered onto a bale of plywood.

Fig. 4 is a detail view of the I-beam loader support elements taken from the end of a supported I-beam.

Fig. 5 is a view in end elevation of the bale with the beams inserted prior to the removal of the bale from the press.

Fig. 6 is a perspective view of a finished bale after removal from the press in condition for storage.

The I-beam loader consists primarily of a carrying frame comprising spaced carrying rails 1 and 2 which are connected in parallel relation by means of tie rods 3 and a centrally disposed channel 4. Tie rods 3 and channel 4 are so shaped and disposed as to position carrying rail 2 at an elevated horizontal level with relation to carrying rail 1 when the loader is resting upon a flat surface as shown in Fig. 2. Feet 5, which are secured to the under side of carrying rail 2, serve to support the framework in stable floor position.

Both the low side carrying rail 1 and the high side carrying rail 2 are provided with means for the support and alignment of the required number of I-beams 6 which are to be loaded on the frame in spaced parallel arrangement transversely of the rails as shown in Fig. 1. Such support means includes, on the high side carrying rail 2, inwardly projecting, spaced suspension pegs 8 between which pegs the web 10 of the I-beam 6 is confined and upon which the under surface of upper flange 9 of the I-beam rests, as best shown in Figs. 3 and 4. Stability of the I-beam as so positioned is insured by overhanging clip 11. This clip will not permit the beam end to lift while the lifting and placing operations are carried out.

The low side carrying rail 1 is provided with spaced pairs of upstanding guide pegs 12 and with a support roller 14 for each pair. The rollers are rotatably mounted in side brackets 13. The bearing surfaces of the rollers are elevated above the top surface of rail 1 so as to provide a clearance 15 therebetween, as best shown in Fig. 3. The rollers are aligned complementary with the space between the upstanding guide pegs 12 so that the loaded I-beam 6 rests upon the roller 14 between the guide pegs 12. The distance between carrying rails 1 and 2 is made slightly greater than one half the normal length of the I-beam. Thus, when the I-beam is properly loaded on the frame, its center of gravity will be disposed immediately interiorly of carrying rail 1. The support of the respective beams on the frame may be likened to a cantilever arrangement; the entire framework acting as a cantilever support for the portions of the beams projecting beyond the carrying rail 1.

It is to be noted that each loading frame is provided normally with eight sets of rollers, guide pegs, suspension pegs and clips, each set of which is so spaced as to properly align the loaded I-beams for ultimate engagement within the recess of the press platen. Of course the size of the frame and number of sets may be varied depending on the bale area to be covered.

The loaded frame may be lifted mechanically, as by a power crane or the like, by means of a tripodal suspension rig or bail comprising rod like legs 18, 19 and 20. Legs 18 and 19 are secured, near the opposite ends of carrying rail 1, to brackets 21 which are provided with apertures 22 for engagement with the hooked ends of rods 18 and 19. Leg 20 of the tripodal suspension rig is offset from rail 1 and is hooked to cross channel 4 through aperture 23 therein. Legs 19 and 20 are provided with adjustable turnbuckles 24 whereby the lifting force may be adjusted with respect to the balance of the I-beams on the frame. The other ends of each leg 18, 19 and 20 mutually join at the lifting clevis 25.

In operation the I-beams are loaded on the frame at floor level. When completely loaded it will be observed that the ends of each I-beam will considerably overhang low side carrying rail 1; the entire arrangement being balanced on a center of gravity disposed immediately inside of carrying rail 1 and below the clevis 25. The loader is lifted by means of the tripodal suspension rig to a level alongside the top of bale 26 which is positioned in the hydraulic press. Only a top frame member 29 of the press is illustrated.

The I-beam 6 may be simultaneously delivered from the frame and onto the top of the bale 26 by manually pushing the frame until low side rail 1 of the frame is abruptly arrested against the top 29 of the press. The momentum of the I-beams disengages the respective beams from the pins 8 and clips 11 to continue the beams on over the rollers and onto the top of the bale. The loading frame may now be withdrawn for use elsewhere.

As is best shown in Fig. 5 the top platen 27 of the press is adapted to this work by bolting a series of fixed I-beams 28 thereto. The bottom flanges 31 of the beams 28 act as a platen or discontinuous plate to exert pressure against headboard 32 which is interposed between the plywood stack 26 and the flanges 31. The fixed beams 28 are spaced to provide channels or recesses therebetween to receive the baling beams 6 delivered by the loading frame. The fixed beams 28 have more widely spaced flanges than the baling beams so as to provide ample clearance space for reception of the baling beams before or after the bale has been compressed.

As is frequently the case the initial serving of the beams may not adequately position them on the bale and the beam ends may project unduly from the top edge of the bale. For the purpose of simultaneously completing the service the loading frame may be swung away from the bale and then toward the bale to project the low side rail 1 simultaneously against said projecting ends to uniformly bodily move the beams to such position that only minor manual shifting need be done to properly position the beams in the recesses of the press platen.

Upon clamping the paired baling beams together (Fig. 6) the platen 27 with its fixed beams 28 may be lifted and the bale removed from the press and taken to storage for curing.

From the foregoing description taken in connection with the accompanying drawings it is seen that a novel apparatus for loading I-beams on the top of a bale of plywood is disclosed. By the use of this apparatus all the I-beams are loaded at floor level and are simultaneously lifted and delivered onto the top of the bale in proper spaced relation for seating engagement with the press platen recesses.

I claim:

1. In a beam loader the combination of a loading frame having parallel carrying rails in spaced connection, suspension means for the frame, and transversely aligned complementary means at each of said rails for the guided and aligned transverse support of beams on the frame, one of said means being laterally open to provide a way over which the beams may be delivered laterally from the loader.

2. The device of claim 1 wherein one of said carrying rails is horizontally offset from the other of said rails.

3. The device of claim 1 wherein the transversely aligned support means for the beams comprises the combination on one of said rails of longitudinally spaced inwardly projecting support pegs and overhanging guide clips and the combination on the other of said carrying rail of longitudinally spaced upstanding guide pegs and support rollers associated therewith whereby the beams may be supported and delivered outwardly from said frame over said rollers.

4. The combination of claim 1 wherein the support means comprises a tripodal system of suspension rods, two of the legs of which are secured near the ends of one of said carrying rails and the other leg of which is attached to the frame at a point offset from said rail, one of said first mentioned legs and said last mentioned leg having adjusting means whereby the frame may be tilted with respect to its support means.

5. In a beam loader the combination of a loading frame comprising spaced parallel rails, cross members connecting said spaced parallel rails, means associated with said rails for simultaneous delivery of the beam load comprising in attachment with one of said rails a series of spaced inwardly projecting pairs of beam guide pegs, and in attachment with the other of said rails complementary longitudinally spaced pairs of upstanding guide pegs and support rollers between the pegs of said pairs, and means for lifting the frame-work with its beam load comprising a tripodal suspension system including adjustable legs affixed near the ends of one of said carrying rails and at an intermediate point on one of the cross members.

6. In a device of the character described a loading frame comprising parallel carrying rails in spaced connection, one of which rails being horizontally offset from the other of said rails, one of said rails being provided with upstanding longitudinally spaced pairs of beam guide pegs and complementary longitudinally spaced beam support rollers between the pegs of said pairs.

7. The device of claim 6 wherein the other of said rails is provided with longitudinally spaced inwardly projecting guide clips and longitudinally spaced inwardly projecting pairs of guide pegs for the guided support of the ends of the loaded beams.

8. In a beam loader the combination with a loading frame comprising carrying rails connected in spaced parallel relation by a plurality of cross members, of a tripodal suspension support means comprising a lift clevis offset toward one of said rails and three suspension rods, two of said suspension support rods having spaced suspensive connection with one of said rails and the other rod having suspensive connection with a cross member, at least one of said rods having adjusting means whereby to adjust the position of said clevis respecting said rails.

9. In a device of the character described a carrying frame comprising parallel carrying rails in spaced connection, the distance between said rails being slightly greater than one-half the length of the beams intended to be transversely carried thereon, and means connected to the respective rails for supporting beams in cantilevered relation to said frame.

10. A beam lifting and positioning device including a first rail for support of a mid point of a beam, a second rail connected to said first rail and positioned for engagement with an end portion of the beam to maintain the beam in cantilevered relation with said first rail, and a lifting bail connected to said lifting and positioning device whereby to maintain the beam in approximately horizontal position supported by said bail.

11. The device of claim 10 wherein the first rail is carried by said bail at a lower level than the second rail and the second rail is positioned to abut an end of the beam.

12. The device of claim 10 wherein the first rail is carried by said bail at a lower level than the second rail and the second rail is positioned to abut an end of the beam, said second rail having means projecting laterally thereof toward the first rail for preventing beam movement upwardly or downwardly with respect to said second rail, said beam being free to be movably projected laterally from its abutted relation to said second rail.

GUSTAV A. SEIDEL.

REFERENCES CITED

The following references are of record in the file of this patent:

UNITED STATES PATENTS

| Number | Name | Date |
| --- | --- | --- |
| 1,291,437 | Desch | Jan. 14, 1919 |
| 1,779,484 | McWane | Oct. 28, 1930 |
| 2,063,040 | Jolly | Dec. 8, 1936 |